United States Patent
Delbosc et al.

(10) Patent No.: US 12,506,418 B2
(45) Date of Patent: Dec. 23, 2025

(54) ELECTRICAL MODULE CONFIGURED TO BE CONNECTED TO A POWER SHAFT OF A TURBINE ENGINE FOR AIRCRAFT AND METHOD FOR ASSEMBLING SUCH A MODULE

(71) Applicant: SAFRAN ELECTRICAL & POWER, Blagnac (FR)

(72) Inventors: Philippe Delbosc, Moissy-Cramayel (FR); Benoit Michaud, Moissy-Cramayel (FR); Udo Muller, Moissy-Cramayel (FR); Remi Goncalves, Moissy-Cramayel (FR); Samir Nehme, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 224 days.

(21) Appl. No.: 18/555,674

(22) PCT Filed: Apr. 11, 2022

(86) PCT No.: PCT/EP2022/059573
§ 371 (c)(1),
(2) Date: Oct. 16, 2023

(87) PCT Pub. No.: WO2022/223337
PCT Pub. Date: Oct. 27, 2022

(65) Prior Publication Data
US 2024/0195317 A1 Jun. 13, 2024

(30) Foreign Application Priority Data
Apr. 18, 2021 (FR) .................................... 2104010

(51) Int. Cl.
*H02M 7/00* (2006.01)
*B64D 27/35* (2024.01)
*H02K 11/00* (2016.01)

(52) U.S. Cl.
CPC ............ *H02M 7/003* (2013.01); *B64D 27/35* (2024.01); *H02K 11/0094* (2013.01); *H02K 2213/12* (2013.01)

(58) Field of Classification Search
CPC ... H02M 7/003; B64D 27/35; H02K 11/0094; H02K 2213/12; H02K 16/00; H02K 2213/06; H02K 11/33; H02J 3/38
(Continued)

(56) References Cited

U.S. PATENT DOCUMENTS

2020/0162006 A1* 5/2020 Kim .................... H02K 5/04
2022/0190693 A1* 6/2022 Uneme ................ H02K 11/33
(Continued)

FOREIGN PATENT DOCUMENTS

EP 3276774 1/2018
FR 3063404 8/2018
(Continued)

OTHER PUBLICATIONS

International Search Report from Corresponding International Application No. PCT/EP2022/059573, dated Jul. 7, 2022, 6 pages.
(Continued)

*Primary Examiner* — Ahmed Elnakib
(74) *Attorney, Agent, or Firm* — RANKIN, HILL & CLARK LLP

(57) ABSTRACT

An electrical module configured to be connected to a power shaft of a turbine engine of an aircraft. The electrical module being configured to draw off power from/inject power into the power shaft. The electrical module comprising an electric machine comprising a machine housing in which a stator
(Continued)

and a rotor is mounted, configured to be mechanically connected to the power shaft, the machine housing having a cylindrical shape extending along a cylinder axis, a first electric converter mounted in a first housing, a second electric converter mounted in a second housing, the second converter being independent of the first converter, the first housing and the second housing each being in the shape of a half-cylinder extending along the cylinder axis so as to form a cylindrical assembly that is mounted as an extension of the machine housing of the electric machine to limit the size of the electrical module.

13 Claims, 12 Drawing Sheets

(58) Field of Classification Search
USPC ........................................................ 310/68 D
See application file for complete search history.

(56) References Cited

U.S. PATENT DOCUMENTS

| 2023/0098523 A1* | 3/2023 | Sasongko | H02K 11/30 |
| | | | 322/44 |
| 2025/0016952 A1* | 1/2025 | Chaperon | H05K 7/20927 |

FOREIGN PATENT DOCUMENTS

| FR | 3087960 | 5/2020 |
| FR | 3089715 | 6/2020 |
| WO | 2022/223337 | 10/2022 |

OTHER PUBLICATIONS

French Search Report from Corresponding French Application No. FR2104010, dated Nov. 17, 2021, 2 pages.

* cited by examiner

ELECTRICAL MODULE CONFIGURED TO BE CONNECTED TO A POWER SHAFT OF A TURBINE ENGINE FOR AIRCRAFT AND METHOD FOR ASSEMBLING SUCH A MODULE

TECHNICAL FIELD

The present invention relates to the field of hybridization of an aircraft turbine engine and, more particularly, an electrical module allowing such hybridization.

In a known manner, an aircraft turbine engine comprises one or more rotating power shafts (low pressure shaft, high pressure shaft, etc.) and it has been proposed to use one or more electric machines to draw off power from and/or inject power into the rotating power shaft(s) depending on the operating conditions.

On the one hand, an electric machine may be used to draw off mechanical energy to supply electrical energy (generator operation) and, on the other hand, it may be used to supply mechanical energy from electrical energy (engine operation). An electric machine is traditionally associated with an electric converter connected to an electrical network. In generator operation, the converter makes it possible to convert the electrical energy from the electric machine to supply the electrical network. In engine operation, the converter makes it possible to supply the electric machine from the electric network.

In order to limit the size and reduce the length of wiring, it has been proposed to combine the electric machine and its converter in the same electrical module, i.e., in a same assembly. Advantageously, the short wiring length between the electric machine and the converter makes it possible to reduce the overvoltages at the input of the electric machine which are linked to the converter switching. In practice, the electrical module must be installed close to the power shafts, i.e. in thermal and vibration environments that are severe and which increase the risk of breakdowns.

To limit this risk, it is known to provide redundancies in order to ensure continuity of service. An immediate redundancy solution would be to provide two separate electrical modules, but this excessively penalizes the size and mass. Therefore, it has been proposed to provide an electrical module comprising two independent functional channels, each functional channel having an electric machine part and a converter part. In other words, the electrical module is shared between channels that may operate individually or collectively.

Although interesting in terms of size and mass, such a solution nevertheless has, due to the proximity of the functional channels, a high risk of failure propagation from one functional channel to another. Therefore, each element of a functional channel must be intrinsically reliable by limiting the type and number of possible faults.

The permanent magnet machine is known to have many advantages in terms of power density among electric machines. As a reminder, a machine with permanent magnets comprises a rotor, equipped with magnets, and a stator which comprises windings and insulators.

In fact, the insulators of the stator may have faults and are likely to generate a short circuit in the windings that may cause heating, smoke or fire. The probability of this type of fault increases for an application relating to the hybridization of an aircraft turbine engine given that the supply voltage is high, the converter switches at high frequencies (which stresses the windings) and the pressure is low at high altitude (the low pressure being likely to generate partial discharges resulting in the degradation of the insulators). In addition, since the magnetization is permanent in a permanent magnet machine, it is not possible to immediately stop the source of the short circuit when a failure is detected while the rotor is being driven.

In order to eliminate at least some of these disadvantages, a new type of electrical module is proposed of which the size is reduced and comprising two independent functional channels and limiting the risk of failure propagation.

Incidentally, power supply devices are known in the prior art by patent applications US2020162006A, FR3089715A1 and FR3087960A1.

SUMMARY

The invention relates to an electrical module configured to be connected to a power shaft of an aircraft turbine engine, the electrical module being configured to draw off power from/inject power into said power shaft, the electrical module comprising:

An electric machine comprising a machine housing wherein a stator and a rotor are mounted, configured to be mechanically connected to the power shaft, the machine housing having a cylindrical shape extending along a cylinder axis, A first electric converter mounted in a first housing, A second electric converter mounted in a second housing, the second converter being independent of the first converter, The invention is remarkable by the fact that the first housing and the second housing are each in the form of a half-cylinder extending along the cylinder axis so as to form a cylindrical assembly that is mounted as an extension of the machine housing of the electric machine in order to limit the size of the electrical module.

Each converter advantageously has its own housing and is mounted at an equal distance from the electric machine, which allows homogeneous conversion between each inverter. The propagation of faults is advantageously reduced as the housings are independent.

Preferably, each housing comprises a curved casing, a side cover and a central cover. Such a housing has substantial accessibility, in particular, through the opening closed by the central cover in order to be able to mount the elements of the converter in a convenient and precise manner.

Preferably, the central covers of the housings are positioned in contact so as to limit the size and allow a robust association.

Preferably, each converter comprises at least two power inverters and the electric machine comprises a stator comprising at least four stars connected to said power inverters. Thus, each converter may participate in the formation of stator current. Such an architecture allows the electric machine to be able to operate even if one of the converters fails.

Preferably, each power inverter is three-phase and connected to a star. More preferably, the electric machine comprises a stator comprising windings connected 3 by 3. More preferably, the stator forms 4 stars which are connected to the four three-phase power inverters.

Preferably, each converter comprises only two power inverters and the electric machine comprises a stator comprising only four stars connected to said power inverters (two inverters for each of the two converters). Such an electrical module has an optimal structure.

According to one aspect of the invention, each converter comprises a power inverter and the electric machine comprises a stator comprising at least two stars connected to said power inverters. An inverter is thus connected to a single star.

According to a first aspect, the stars being distributed angularly in the stator, preferably uniformly, the two power inverters of a converter are connected to the stars with which they are aligned. Thus, the electrical connections are short and without any crossovers, which increases reliability and reduces the probability of failure. In other words, the stars are directly connected to the converter with which the stars are aligned. The two power inverters of a converter are connected to adjacent stars.

According to a second aspect, the stars being distributed angularly in the stator, preferably uniformly, the two power inverters of a converter are not connected to the stars with which they are aligned. The two power inverters of a converter are connected to distant stars, preferably to diametrically opposite stars. In this way, the converters individually supply the electric machine in a symmetrical way, allowing power to be drawn off/injected more homogeneously on a power shaft, thus improving the service life of the turbine engine. In other words, the stars are not directly connected to the converter with which the stars are aligned. Two diametrically opposite stars are preferably connected to the same converter.

Preferably, each converter comprises at least one capacitor in the shape of a half-cylinder. Such a capacitor makes it possible to use the available space optimally to fulfill its function.

Preferably, the converters are removably mounted in the electrical module, which facilitates maintenance and limits the propagation of faults.

Preferably, each electrical converter comprises at least one input filter. Preferably, the input filter comprising a plurality of inductances, each electric converter comprises at least one terminal block connected to the inductances without crossover. Any crossover of connecting electrical wiring is avoided, which reduces the risk of faults.

Preferably, each electric converter comprises at least one electronic interface card configured to control the power inverters.

The invention also relates to a method for assembling an electrical module, as presented previously, comprising steps of:
  assembling the first housing of the first converter with the second housing of the second converter in order to form a cylindrical assembly and
  assembling said assembly as an extension of the machine housing of the electric machine.

The invention also relates to an assembly of an electrical module, as presented previously, and a power shaft of an aircraft turbine engine, the rotor of the electric machine being mechanically connected to the power shaft to draw off power from/inject power into said power shaft. The invention further relates to an aircraft comprising an assembly as presented previously.

DESCRIPTION OF THE DRAWINGS

The invention will be better understood upon reading the following description, given as an example, and in reference to the following figures, given as non-limiting examples, wherein identical references are given to similar objects.

It should be noted that the figures set out the invention in detail in order to implement the invention, said figures may of course be used to better define the invention where applicable.

DETAILED DESCRIPTION

Figure 1:
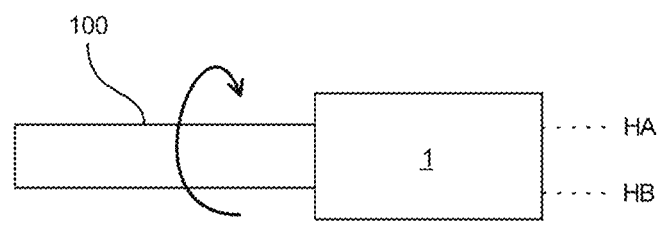
FIG. 1 is a schematic representation of an electrical module according to one embodiment of the invention mounted on a power shaft of an aircraft turbine engine.

In reference to FIG. 1, a power shaft 100 of an aircraft turbine engine is shown, in particular, a low-pressure or high-pressure shaft. According to the invention, an electrical module 1 is connected to the power shaft 100 to draw off power/inject power into said power shaft 100.

Figure 2:
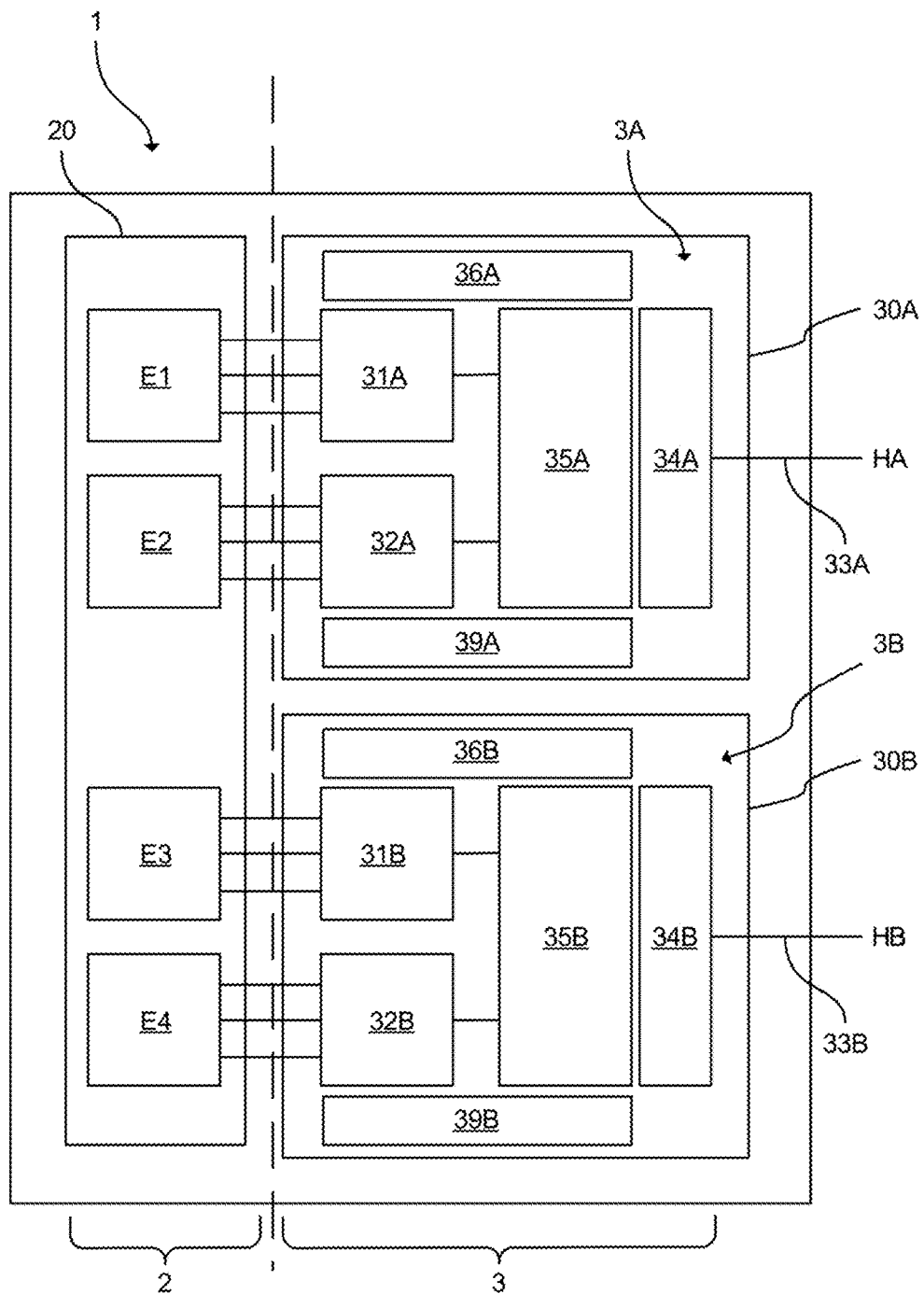
FIG. 2 is a schematic function representation of the electrical module.

As shown in FIG. 2, the electrical module 1 comprises an electric machine 2 and a converter 3. The converter 3 includes a first electric converter 3A and a second electric converter 3B, which are independent and thus define two functional channels.

Figure 3:
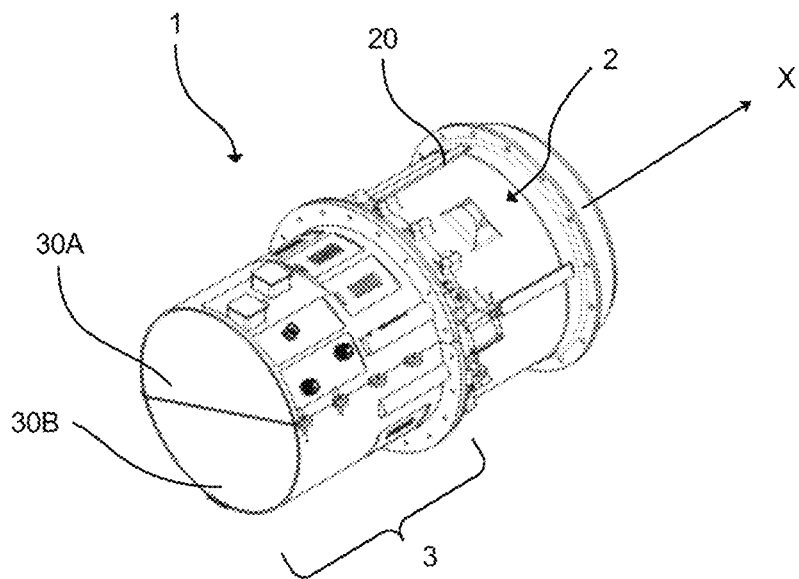
FIG. 3 is a schematic perspective representation of an electrical module with two converters.

The electric machine 2 comprises a machine housing 20 wherein a stator and a rotor configured to be mechanically connected to the power shaft 100 are mounted. The electric machine 2 is configured to operate as an engine or generator. As shown in FIG. 3, the machine housing 20 has a cylinder shape, which is suitable for a machine rotating about the axis of the cylinder. The electric machine 2 will be shown in more detail later.

As shown in FIG. 2, the first electric converter 3A is mounted in a first housing 30A and configured to perform an electric conversion between the electric machine 2 and a first electric network HA. The second electric converter 3B is mounted in a second housing 30B and configured to perform an electric conversion between the electric machine 2 and a second electric network HB, the second converter 3B being independent from the first converter 3A.

Figure 4:
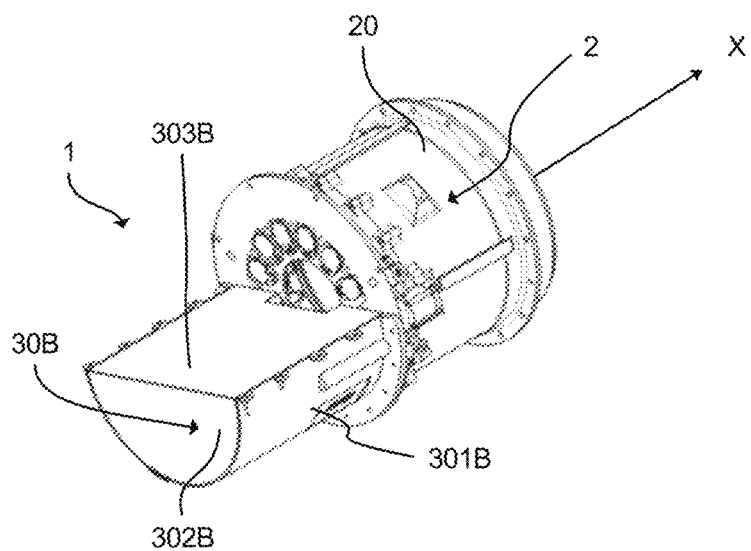
FIG. 4 is a schematic representation of the electrical module in FIG. 3 without the first converter.
Figure 5:
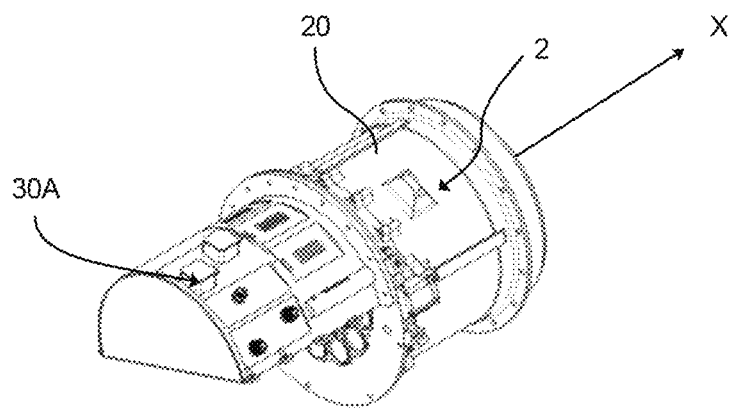
FIG. 5 is a schematic representation of the electrical module in FIG. 3 without the second converter.

According to the invention, as shown in FIGS. 3 to 5, the first housing 30A and the second housing 30B are each in the form of a half-cylinder so as to together form a global converter, comprising two functional channels, of cylindrical shape. The latter may thus be mounted in the extension of the machine housing 20 to form an electrical module 1 with a reduced size.

Thanks to the invention, the two converters 3A, 3B are independent but do not increase the global size of the electrical module 1 in order to form a compact assembly. The use of half-cylinder housings 30A, 30B makes it possible to facilitate the assembly of converters 3A, 3B and to increase the functional and structural separation to limit the propagation of faults between converters 3A, 3B. The complementarity of the shapes in addition makes it possible to facilitate the interface with the electric machine 2, which remains cylindrical.

The different elements of the electrical module 1 will now be presented in detail.

As shown in FIG. 2, the electric machine 2 comprises a stator comprising four three-branched stars E1-E4. The rotor of electric machine 2 is not shown in this example. According to a preferred aspect, the electric machine 2 is of the permanent magnet type. As mentioned previously, such an electric machine has many advantages in terms of power density. The stator structure will be presented later in reference to FIGS. 20 to 23.

The first converter 3A is shown schematically in FIG. 2. The first converter 3A is mounted in a first housing 30A which will be presented in more detail later. In this example, the first converter 3A comprises two three-phase inverters 31A, 32A which are interlaced so as connect a first bus 33A, connected to the first electrical network HA, to two stars E1-E2 of the electric machine 2. The connection between the inverters 31A, 32A and the winding of the electric machine 2 will be presented later.

In a known manner, the first converter 3A further comprises an input filter 34A, a capacitor 35A, close electronic control cards 36A of the inverters 31A, 32A as well as one or more electronic interface cards 39A, 39B.

The second converter 3B is similar and its internal structure will not be presented in detail. The elements of the second converter 3B are referenced similarly, which are terminated with index B.

As shown in FIGS. 3 to 5, the machine housing 20 of the electric machine 2 has a cylindrical shape in order to house the rotor centrally and the stator peripherally outside the rotor. Subsequently, the cylinder, of which machine housing 20 has the shape, extends along an X axis oriented from the rear towards the front. Likewise, the terms "internal" and "external" are defined radially with respect to the axis X.

The first housing 30A and the second housing 30B of the converters 3A, 3B each have the shape of a half-cylinder so as to together form a cylinder which is mounted in the extension of the machine housing 20 in order to form an electrical module 1 of reduced size. In this example, the converters 3A, 3B are joined together. Each housing 30A, 30B comprises a front mounting flange to be joined to the machine housing 20 of the electric machine 2.

Advantageously, each converter 3A, 3B has its own independent housing 30A, 30B. The housings 30A and 30B may thus be mounted/dismounted independently, which facilitates maintenance.

As shown in FIG. 4, the second housing 30B comprises a curved casing 301B, a side cover 302B (rear cover), which extends orthogonally to the axis X, and a central cover 303B which extends parallel to the axis X. The second housing 30B is open on the side of its side face (front face) opening onto the electric machine 2. The first housing 30A has a similar structure.

This half-cylinder configuration makes it possible, on the one hand, to avoid the propagation of a fault between two converters 3A, 3B and, on the other hand, to facilitate industrialization and manufacturing. Indeed, the mounting of the elements of a converter 3A, 3B inside a housing 30A, 30B is facilitated thanks to access from the 3 sides (side faces and flat face), as will be presented later. Such a solution is advantageous in comparison to a cylindrical housing for which access is only possible from the side faces.

An example of an embodiment of a method for assembling a converter 3A, 3B, in particular, of the first converter 3A will be presented.

Figure 6:
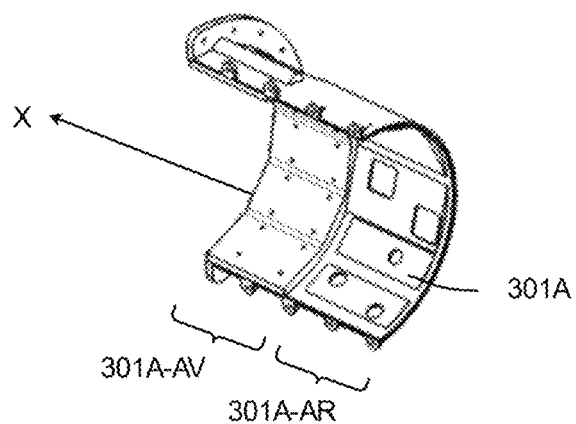
FIG. 6 is a schematic perspective representation of the curved casing of the first housing of the first converter.
Figure 7:
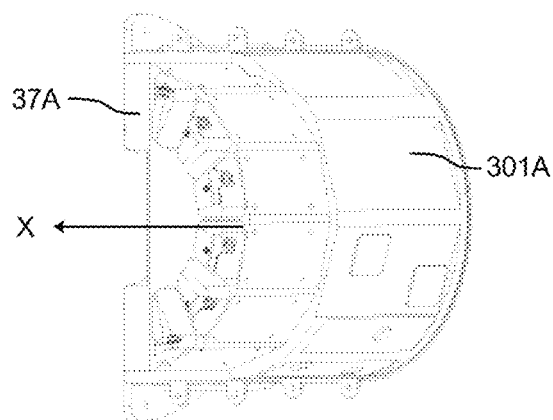
FIG. 7 is a schematic representation of the mounting of an insulating flange.

In reference to FIG. 6, only the curved casing 301A of the first housing 30A is shown which is accessible from the two side faces (front face opening onto the electric machine 2 and rear face which is not closed in the absence of lateral cover 302A). Due to its accessibility, components may be conveniently and precisely positioned in the curved casing 301A. In this example, the curved casing 301A comprises a front part 301A-AV turned towards the electric machine 2 and a rear part 301A-AR which opens onto the rear face.

The mounting steps will be presented in reference to FIGS. 7 to 14.

First, an electrical insulating flange 37A is mounted in the front portion 301A-AV of the curved casing 301A (FIG. 7), especially at the front face. The flange 37A integrates the connectors intended to be connected to the inverters 31A, 32A. In this example, the flange 37A is positioned transversely to the X axis and comprises separation walls configured to receive the inverters 31A, 32A. The 37A flange is intended to come into contact with the electric machine 2.

Figure 8:
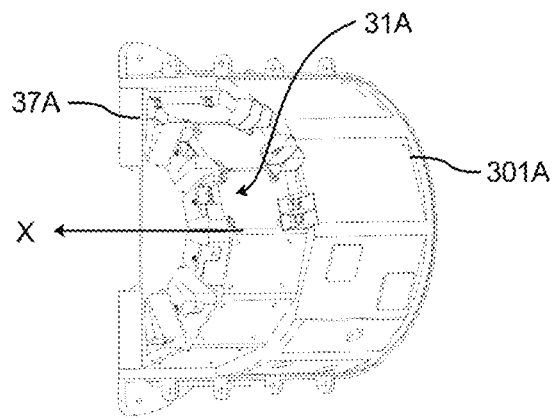
FIG. 8 is a schematic representation of the mounting of a first assembly of power inverter units.
Figure 9:
FIG. 9 is a schematic representation of the mounting of a second assembly of power inverter units.

As shown in FIGS. 8 and 9, power inverters 31A, 32A are then positioned at the inner periphery of the curved casing 301A so as to maximize the transfer of calories. According to a preferred aspect, the curved casing 301A comprises cooling fluid channels (e.g. oil), cooling fins, or other means of cooling. Each power inverter 31A, 32A comprises three units, each corresponding to one inverter arm. The power inverters 31A, 32A are positioned directly opposite the branches of the stars E1-E2 with which they are connected (configuration FIG. 18). Alternatively, the electrical insulating flange 37A could be positioned after the power inverters 31A, 32A.

Figure 10:
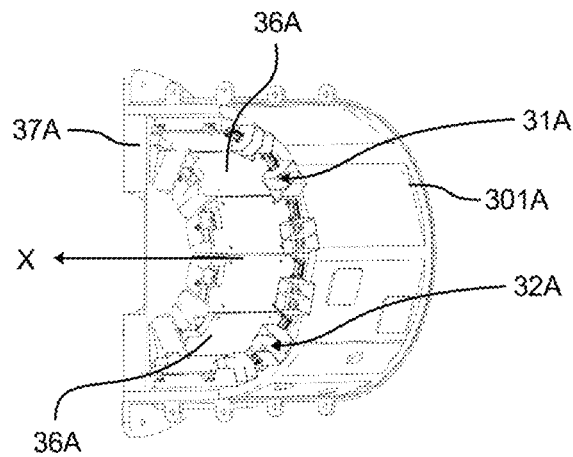
FIG. 10 is a schematic representation of the mounting of close electronic control cards.

Close electronic control cards 36A, also known to those skilled in the art as "drivers", are positioned internally with respect to the inverters 31A, 32A as shown in FIG. 10. This makes it advantageous to limit the presence of high voltage in this area. It goes without saying that the close electronic control cards 36A could also be integrated into the inverters 31A, 32A.

Figure 11:
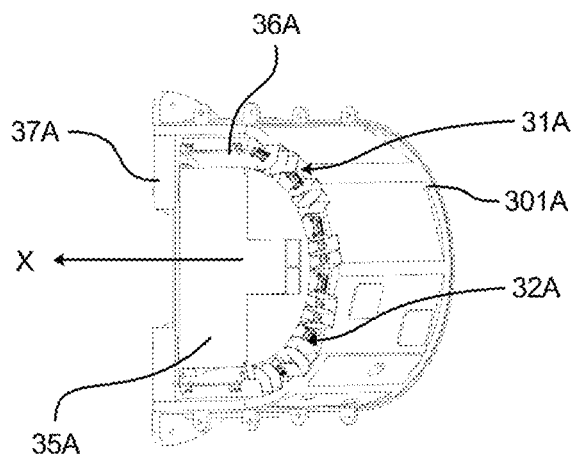
FIG. 11 is a schematic representation of the mounting of a capacitor.

Then, in reference to FIG. 11, a capacitor 35A is mounted internally to the close electronic control cards 36A and behind the flange 37A in order to ensure a link between the power inverters 31A, 32A and the input filter 34A which will be placed at the rear. Advantageously, the capacitor 35A comprises a half-cylinder shape in order to perform its function optimally considering the space available.

Figure 12:
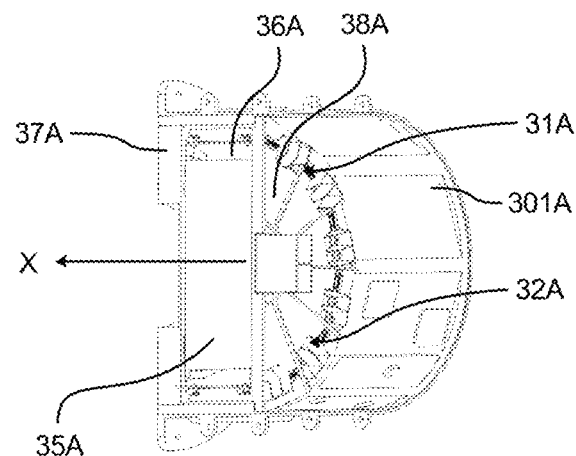
FIG. 12 is a schematic representation of the mounting of a support plate.

In order to place the input filter 34A, in reference to FIG. 12, a support plate 38A, in the form of a half-disk, is positioned at the back of the capacitor 35A, transversely, in order to allow the support of the capacitor 35A and the evacuation of the calories from the capacitor 35A to the curved casing 301A. The support plate 38A comprises through-holes to allow the passage of connectors of the close electronic control cards 36A.

Figure 13:
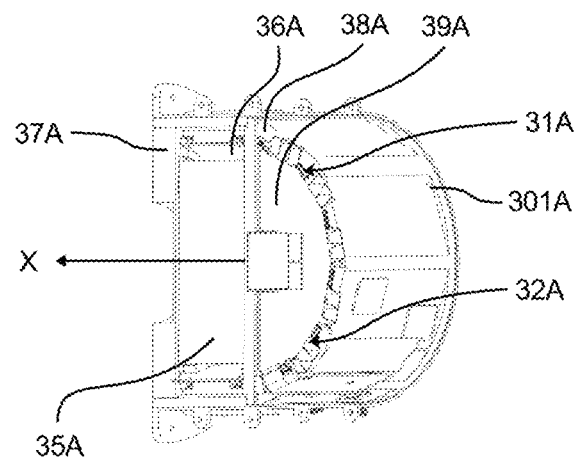
FIG. 13 is a schematic representation of the mounting of an electronic interface card.
Figure 14:
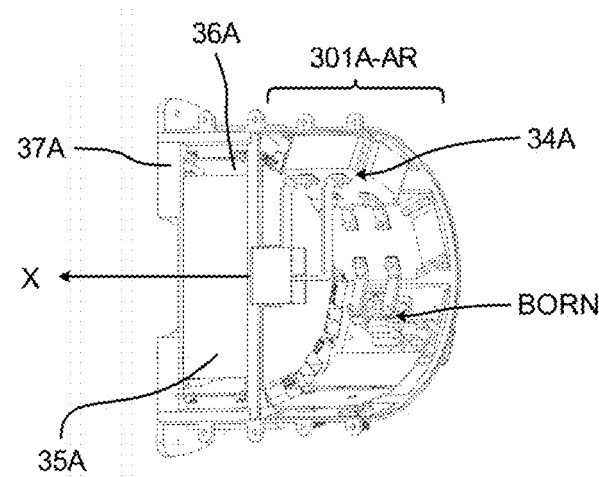
FIG. 14 is a schematic representation of the mounting of an input filter.

As shown in FIG. 13, one or more electronic interface cards 39A are positioned behind the support plate 38A and connected to the connectors of the close electronic control cards 36A in order to control them. In this example, an electronic interface card 39A is positioned transversely against the support plate 38A. Optionally, other electronic cards may be provided, for example, a lightning filtering card.

An input filter 34A is then fixed in the rear part 301A-AR (FIG. 14), this input filter 34A comprises a set of common mode and differential mode filter elements which are, preferably, formed by inductances fixed to the inner face of the curved casing 301A and connected to a terminal block BORN. The terminal block BORN and inductances are arranged to allow internal distribution of the wiring without crossover to the capacitor 35A, hence limiting the fault modes as well as the length of the wiring. In other words, there is no crossover between the inductances of the input filter 34A and the terminal block BORN, but also between the inductances of the input filter 34A and the capacitor 35A to limit the risk of fault.

Figure 15:
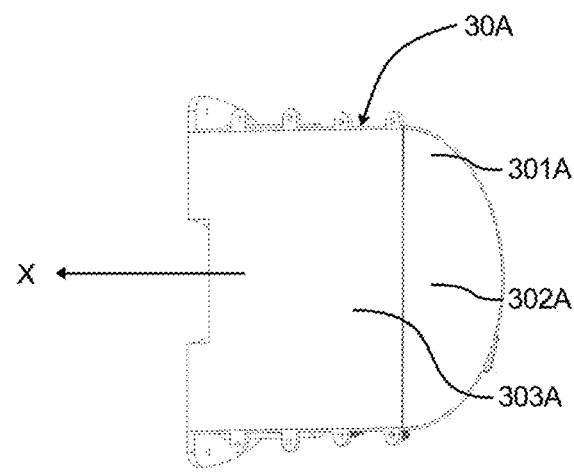
FIG. 15 is a schematic representation of the mounting of the covers to close the first housing.

Finally, in reference to FIG. 15, the first housing 30A is then closed by fitting the side cover 302A and the central cover 303A in order to form the first converter 3A, which may be handled independently.

Figure 16:
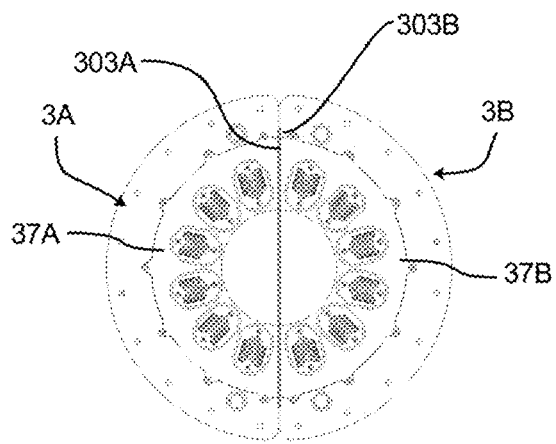
FIG. 16 is a schematic diagram from the front of the two converters mounted together.

As shown in FIG. 3, the first housing 30A and the second housing 30B may be assembled together in order to bring their central covers 303A, 303B into contact. This thus forms a global converter comprising two independent functional channels. As shown in FIG. 16, the global cylindrical shape of the global converter allows it to be conveniently connected to the electric machine 2. The front end of the global converter makes it possible to provide access to the two insulating flanges 37A, 37B of the two converters 3A, 3B, which may thus cooperate conveniently with the electric machine 2.

The electric machine 2 will now be presented in more detail. As shown previously, the electric machine 2 comprises a stator that comprises four three-star branches E1-E4. The stars E1-E4 are distributed angularly, each star E1-E4 being diametrically opposed to another star. Subsequently, the stars E1-E4 are divided between two groups which correspond respectively to the two half-cylinders formed by the converters 3A, 3B. Each group of stars is aligned with one of the half-cylinders.

Figure 17:
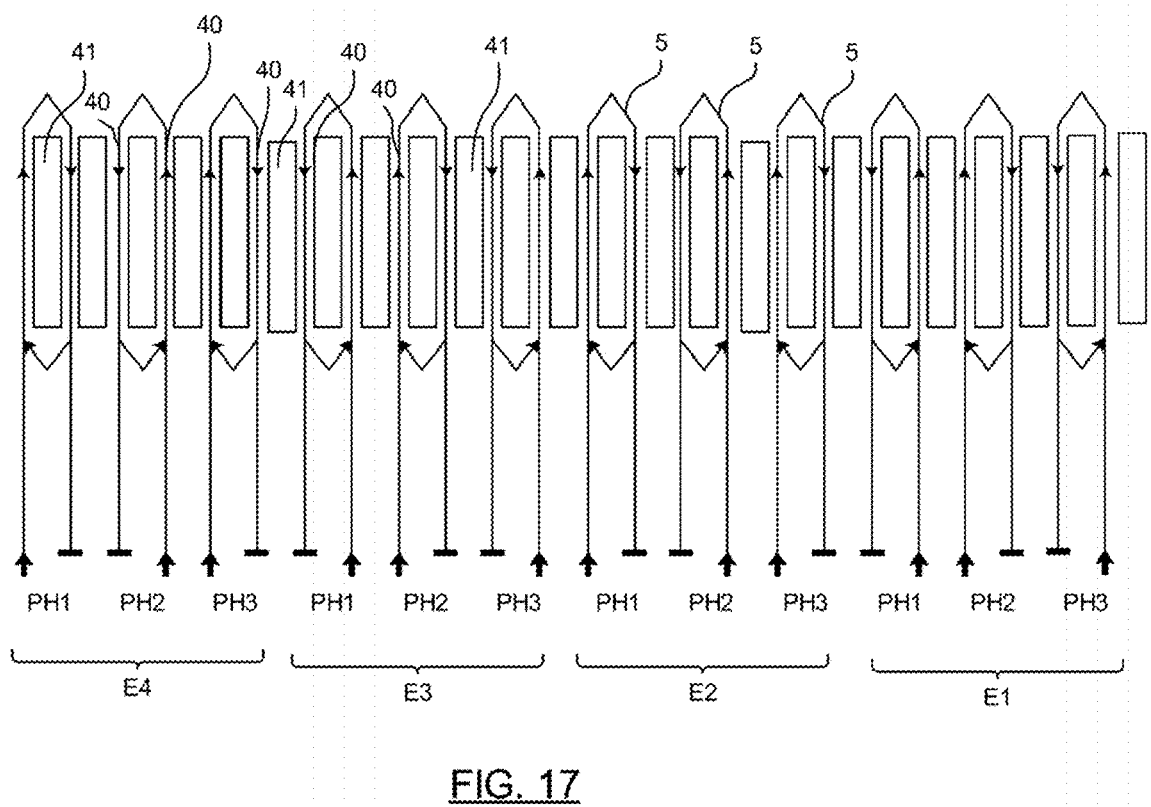
FIG. 17 is a schematic representation of the stator winding of the electric machine.

In reference to FIG. 17, an example of winding in flat peripheral projection ("unwound" view) is shown. In this example, a peripheral structure 4 is shown wherein 24 notches 40 are formed for mounting 12 coils 5 of annular shape. Two consecutive notches 40 delimit between them a tooth 41 allowing to support the winding. Each coil 5 comprises a phase PH1-PH3 to connect. In a known manner, each coil 5 comprises several turns. Each star E1-E4 thus comprises three phases PH1-PH3. In this example, there is a single phase PH1-PH3 per notch 40, i.e., a turn extends going in a notch 40 and extends in return in an adjacent notch 40. The phases PH1-PH3 of each star E1-E4 are separated, which reduces the risk of short-circuiting.

The winding architecture chosen makes it possible to naturally limit possible faults without resorting to a complex insulation system. Such a winding architecture makes it possible to limit all faults synergistically with the innovative structure of the converters 3A, 3B. As observed in FIG. 17, the winding architecture makes it possible to:

increase as much as possible the distance between different phases PH1-PH3, order the turns of a same notch 40 in order to reduce the electrical voltage between two turns of a same notch 40, in order to reduce the stress on the insulator so as not to oversize it, and limit the number of crossovers of turns in the coil heads, each crossover being a possible source of fault and requiring local reinforcement of the insulation system.

Figure 18:
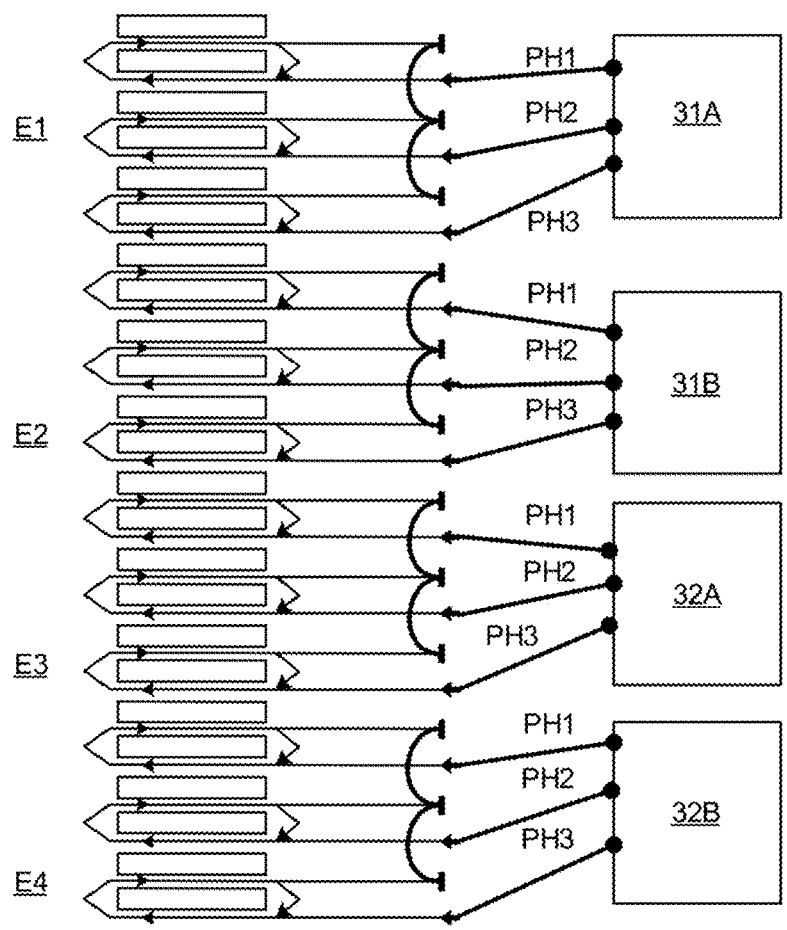
FIG. 18 is a schematic representation of an example of how the stator is interconnected with the converters.

An example of electrical interconnection of the winding with converters 3A, 3B is schematically shown in FIG. 18. For the interconnections of the stars E1-E4 with the converters 3A, 3B, direct connections are preferred with minimum connection lengths. Thus, the inverters 31A, 32A, 32A, 32B are respectively connected to the stars E1-E4. In this example, each converter 3A, 3B controls the stars E1/E2 and E3/E4 of the stator which belong to the same group. Crossovers of turns are avoided. Despite the separation of the converters 3A, 3B into half-cylinders, the connection to the electric machine 2 does not lead to an increase in defects or complexity.

Figure 19:
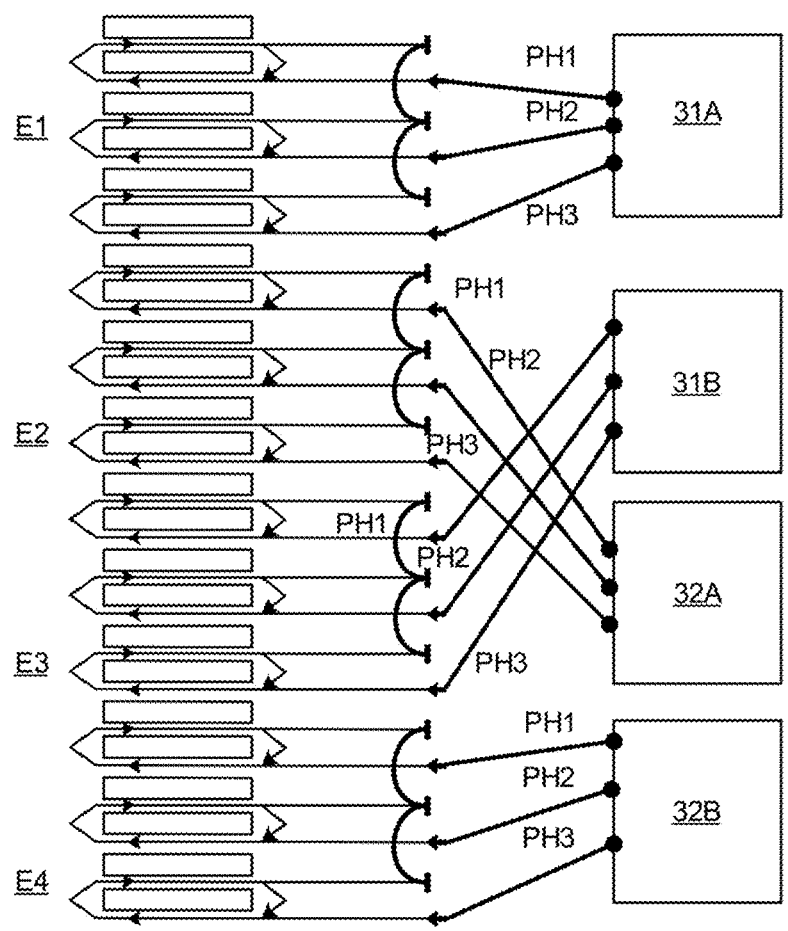
FIG. 19 is a schematic representation of another example of how the stator is interconnected with the converters.

Another example of electrical interconnection of the winding with the converters 3A, 3B is schematically shown in FIG. 19. In this example, each converter 3A, 3B controls the stars E1-E4 of the stator which belong to different groups, in particular, two diametrically opposite stars E1/E3 and E2/E4.

Such a configuration is advantageous given that it makes it possible to ensure symmetry of operation, which is beneficial when drawing off or injecting power into a turbine engine shaft 100. In case of failure, stars belonging to different groups allow current to flow, avoiding the generation of tangential torque over only 180° in the electric machine 2. In the absence of failure, symmetry is also advantageous as the power passing through each converter 3A, 3B is not always identical. The use of opposite stars E1/E3 and E2/E4 by the same converter 3A, 3B makes the use symmetrical. Preferably, an additional insulation is added at the crossover of the connectors linked to the inverters 31B and 32A.

An embodiment of a stator of the electric machine 2 will be presented in reference to FIGS. 20 to 23. The stator has a peripheral structure 4 comprising on its inner surface 24 longitudinal notches 40 evenly spaced. Two consecutive notches 40 delimit between them a tooth 41 making it possible to support the coils 5. In this example, 12 coils 5 are placed in the peripheral structure 4.

Figure 21:
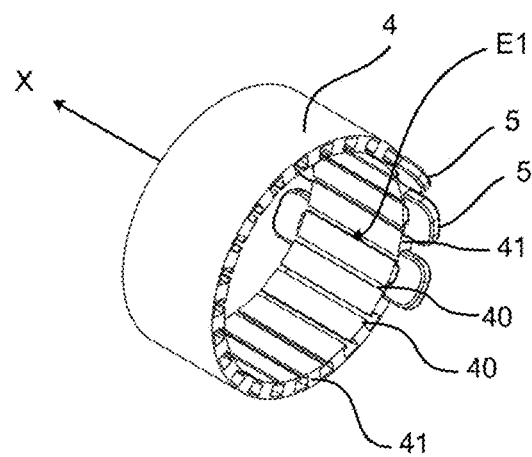
FIG. 21 is a schematic representation of the mounting of three coils.
Figure 22:
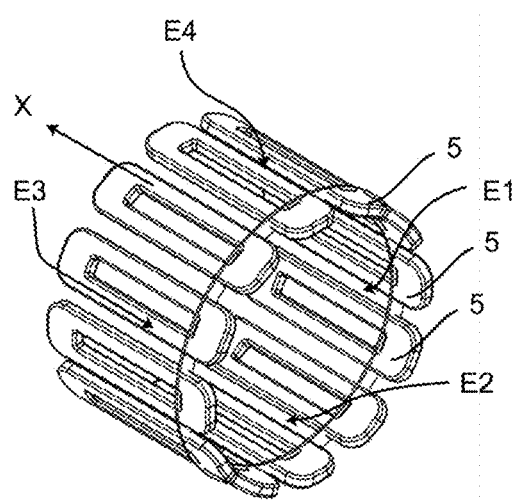
FIG. 22 is a schematic representation of the assembly of coils without the peripheral structure.

As shown in FIGS. 21 and 22, each coil 5 has an elongated annular shape and extends into two consecutive notches 40 of the peripheral structure 4. Each coil 5 comprises in this example 16 turns, but it goes without saying that the number of turns could be different. Each turn comprises one or more conductor wires in parallel. Preferably, each conductor wire has a round or rectangular cross-section. It goes without saying that the number of notches 40 and coils 5 could be different.

As shown in FIG. 22, with the 12 coils 5, 4 three-phase stars E1-E4 may be formed. Electrical connectors (not shown) are also provided to connect phases PH1-PH3 of stars E1-E4 with the converters 3A, 3B.

Figure 20:
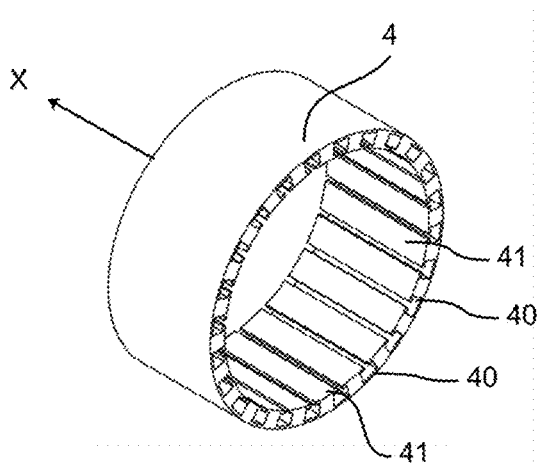
FIG. 20 is a schematic representation of a peripheral structure of the stator without coils.
Figure 23:
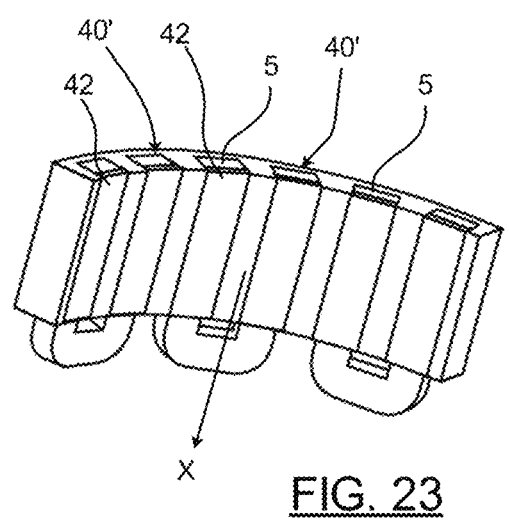
FIG. 23 is a schematic representation of a peripheral structure comprising rectangular notches.

In this example, as shown in FIG. 20, the longitudinal notches 40 have a section substantially in dovetail, but it goes without saying that the notches 40 could have a rectangular section. In the latter case, as shown in FIG. 23, the coils 5 are inserted into rectangular notches 40' which are closed by notched shims 42. Preferably, the assembly then undergoes a vacuum resin impregnation to allow joining. The electric machine 2 thus formed makes it possible to advantageously take the advantageous specificities of the converters 3A, 3B into account without affecting performance or increasing the risk of fault.

To assemble the electrical module 1, in reference to FIG. 3, simply join the machine housing 20, the first housing 30A and the second housing 30B together. The electrical module 1 may be assembled conveniently and quickly by assembling the converters 3A, 3B together and mounting them in the extension of the electric machine 2. The electrical module 1 therefore has a small size, which is advantageous in an aeronautical context.

In reference to FIG. 1, in engine operation, the networks HA, HB separately supply the converters 3A, 3B which respectively supply separate stars E1-E4 of the electric machine 2 thus forming separate functional channels. In case of malfunction of one of the stars E1-E4 or one of the converters 3A, 3B, redundancy is ensured without risk of fault propagation.

The invention claimed is:

1. An electrical module configured to be connected to a power shaft of an aircraft turbine engine, the electrical module being configured to draw off power from/inject power into said power shaft, the electrical module comprising:
   an electric machine comprising a machine housing, wherein the machine housing houses a stator and a rotor, the rotor being configured to be mechanically connected to the power shaft, the machine housing having a cylindrical shape extending along a cylinder axis,
   a first electric converter mounted in a first housing,
   a second electric converter mounted in a second housing, the second converter being independent from the first converter,
   wherein the first housing and the second housing are each in a shape of a half-cylinder extending along the cylinder axis to form a cylindrical assembly which is mounted as an extension of the machine housing of the electric machine to limit a size of the electrical module.

2. The electrical module according to claim 1, wherein the first housing and the second housing each comprise a curved casing, a side cover, and a central cover.

3. The electrical module according to claim 2, wherein the central covers of the first and second housings are positioned in contact.

4. The electrical module according to claim 1, wherein each of the converters comprise at least two power inverters and the electric machine comprises the stator, the stator comprising at least four stars connected to said power inverters.

5. The electrical module according to claim 4, wherein the stars are distributed angularly in the stator, the two power inverters of the converters are connected to the stars with which they are aligned.

6. The electrical module according to claim 4, wherein the stars are distributed angularly in the stator, the two power inverters of the converters are connected to the stars that are diametrically opposite.

7. The electrical module according to claim 4, wherein each of the electrical converters comprises at least one electronic interface card configured to control the power inverters.

8. The electrical module according to claim 1, wherein each of the converters comprises at least one capacitor in a shape of a half-cylinder.

9. The electrical module according to claim 1, wherein the converters are removably mounted in the electrical module.

10. The electrical module according to claim 1, wherein each of the electrical converters comprises at least one input filter.

11. The electrical module according to claim 10 wherein, the input filter comprises a plurality of inductances, each of the electrical converters comprises at least one terminal block connected to the inductances without crossover.

12. A method for assembling the electrical module according to claim 1, comprising the steps of:
   assembling the first housing of the first converter with the second housing of the second converter in order to form the cylindrical assembly; and
   assembling said assembly as an extension of the machine housing of the electric machine.

13. An assembly, comprising:
   the electrical module of claim 1, and
   the power shaft of the aircraft turbine engine, the rotor of the electric machine being mechanically connected to the power shaft so as to draw off power from/inject power into said power shaft.

* * * * *